UNITED STATES PATENT OFFICE.

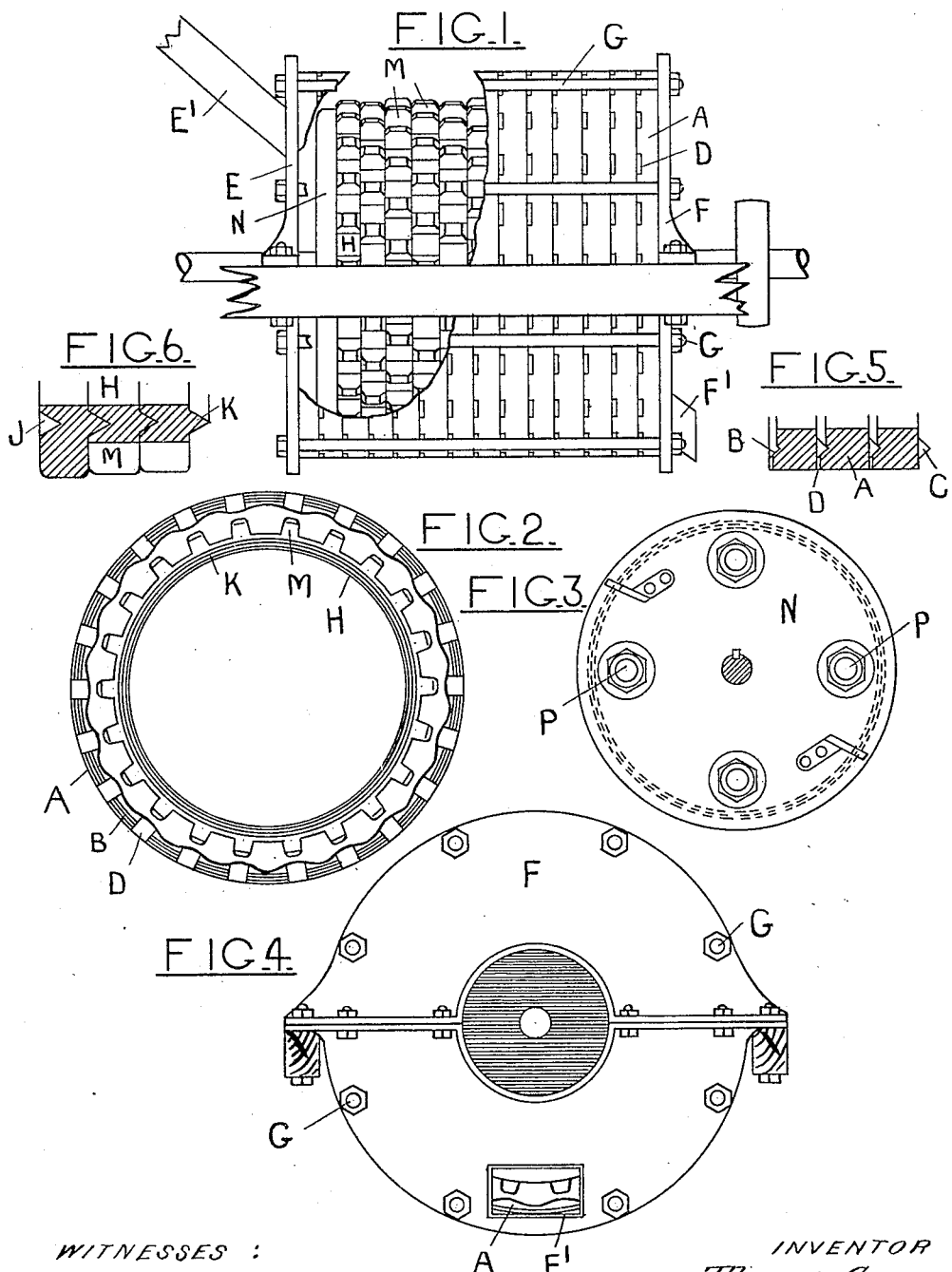

THOMAS GROSE, OF PORT ADELAIDE, SOUTH AUSTRALIA, AUSTRALIA.

GRAIN-SCOURER.

No. 904,950.  Specification of Letters Patent.  Patented Nov. 24, 1908.

Application filed September 10, 1907. Serial No. 392,086.

*To all whom it may concern:*

Be it known that I, THOMAS GROSE, a subject of the King of Great Britain and Ireland, residing at Port Adelaide, State of South Australia, Commonwealth of Australia, have invented a certain new and useful Improved Grain-Scourer, of which the following is a specification.

My improved machine for scouring grain has several advantages over scourers hitherto in use, in that it is simple and economical in manufacture, is far more durable, is driven much more slowly requiring less motive power, and is most effective in operation.

According to my invention the outer casing and the barrel are each constructed of a series of cast iron rings, instead of the perforated plates and steel segments heretofore employed.

In order that my invention may be clearly understood, I will describe the same with reference to the accompanying drawings in which only the scourer proper is shown without any of the draft and dust inclosures or flues.

Figure 1 is a side elevation (with portion of the casing removed) of a scourer constructed according to my invention. Fig. 2 is an end view of one of the casing rings and one of the barrel rings. Fig. 3 is an end view of one of the end plates of the barrel. Fig. 4 is an end view of the end plate at the outlet end of the outer casing. Figs. 5 and 6 are sectional views upon a larger scale showing the fitting together of the casing rings and the barrel rings respectively.

The outer casing is formed of a series of cast iron rings A, secured between two end plates, each ring having at one end a V-shaped annular groove B, and at the other end a V-shaped annular projection C, which projection however is interrupted by a number of shallow recesses D, extending across the end of the ring at regular spaces. When the rings are placed together to form the casing, the projection of one fits into the groove of the next and the recesses serve for ventilation and the escape of dust from the interior of the casing. The inner surface of the rings is corrugated as shown in Fig. 2. The rings are held between end plates E and F, each of which is made in two halves, an upper and a lower, held together by bolts passing through flanges. The plate at the grain inlet end fits closely around the spindle of the drum, but the plate at the outlet end has a large opening surrounding the spindle, such opening being covered with perforated wire to admit a draft but retain the grain. The two end plates are bolted together by bolts G, one of such plates having an annular groove and the other an annular projection corresponding to those on the rings. By releasing these bolts, any rings that have become worn (particularly those at the inlet end) can be readily replaced by new ones at a minimum of expense. The grain inlet $E^1$ and outlet $F^1$, are formed in these end plates and the plates are provided with projecting wings or brackets whereby they may be bolted to a horizontal scourer frame.

The barrel or drum consists of a series of cast iron rings H, secured between two end plates, each ring having a V-shaped annular groove J, at one end and a V-shaped annular projection K at the other, the projection of the one ring fitting the groove of the next when the rings are placed together. The inside of each ring is plain but the outside is provided with a series of tooth-like projections M. The rings are held between two end plates N, which are bolted together and keyed upon a central spindle R, passing through the end plates of the casing and supported in bearings outside of same. The one plate has an annular groove and the other an annular projection corresponding to those on the rings. The heads and nuts of the bolts P are sunk into the end plates. By slackening the bolts P, the rings H can be adjusted spirally one against the other more or less, thereby setting the projections M to form a series of spirals or conveyers whereby the grain can be made to pass through the scourer at a more or less rapid rate. The scourer is provided with a suitable draft producing fan, inclosing case and flues after the usual arrangement.

The operation of my invention is as follows—The drum is rotated within the outer casing by suitable means. The grain is fed through the inlet $E^1$ into the annular space between the outer casing and the rapidly revolving drum, and as it is carried to the outlet $F^1$ it is thrown about between the projections of the drum and the corrugations of the casing and thereby thoroughly cleaned and scoured, the dust escaping through the recesses D in the outer casing.

Having now fully described and ascertained my said invention and the manner in which it is to be performed I declare that what I claim is—

1. A grain scourer comprising an outer casing and an inner drum, said outer casing and inner drum each consisting of a series of rings secured between two end plates, the casing rings having a corrugated inner surface and being provided at one end with a V shaped annular groove and at the other end with a V shaped annular projection, such projection being interrupted by a number of shallow radial recesses across the end of the ring, the end plates of the casing having grain inlet and outlet openings respectively, the drum rings being provided at one end with a V shaped annular groove and at the other with a V shaped annular projection and on their outer surface with a series of tooth-like projections, and the end plates of the drum being mounted upon a central spindle, all substantially as described.

2. In a grain scourer, an outer casing consisting of a series of rings secured between end plates provided with grain inlet and outlet respectively, each of said rings having its inner surface corrugated and having at one end a V shaped annular groove and at the other end a V shaped annular projection, such projection being interrupted by a number of shallow radial recesses extending across the end of the ring so that when placed together the projection of the one ring fits into the groove of the next, and the recesses permit the escape of dust from the interior of the casing, substantially as described.

3. In a grain scourer, an inner drum consisting of a series of rings secured between end plates mounted upon a spindle, each of said rings having on its outside a series of tooth-like projections and having at one end a V shaped annular groove and at the other end a V shaped annular projection, the groove and projection of the rings being at the center thereof so that when placed together the projection of the one ring fits into the groove of the next, substantially as described.

4. In a grain scourer, an inner drum comprising a series of rings, each of said rings having at one end an annular groove and at the other end an annular projection, and having on its outside a series of tooth-like projections, the groove and projection being at the center of the ends of the ring, said rings being secured between end plates mounted upon a spindle and being capable of spiral adjustment one against the other whereby the tooth-like projections may be set to form a series of spirals or conveyers of greater or less pitch, substantially as described.

In testimony that I claim the foregoing as my invention I have signed my name in the presence of two subscribing witnesses this seventeenth day of July 1907.

THOMAS GROSE.

Witnesses:
ARTHUR GORE COLLISON,
JOHN MITCHELL SINCLAIR QUIN.